US008172673B2

(12) United States Patent
Okada

(10) Patent No.: US 8,172,673 B2
(45) **Date of Patent: *May 8, 2012**

(54) GAME SERVER, GAME CONTROL METHOD, AND GAME MACHINE

(75) Inventor: Kazuo Okada, Koutou-ku (JP)

(73) Assignee: Universal Entertainment Corporation, Tokyo (JP)

( * ) Notice: Subject to any disclaimer, the term of this patent is extended or adjusted under 35 U.S.C. 154(b) by 478 days.

This patent is subject to a terminal disclaimer.

(21) Appl. No.: 12/183,654

(22) Filed: Jul. 31, 2008

(65) Prior Publication Data

US 2009/0054150 A1 Feb. 26, 2009

Related U.S. Application Data

(63) Continuation of application No. 10/268,725, filed on Oct. 11, 2002, now abandoned.

(30) Foreign Application Priority Data

Oct. 12, 2001 (JP) ................................. 2001-315488

(51) Int. Cl.
*A63F 9/24* (2006.01)
*G06F 17/00* (2006.01)

(52) U.S. Cl. ................. 463/26; 463/25; 463/27; 463/42

(58) Field of Classification Search .................... 463/25, 463/26, 27, 42
See application file for complete search history.

(56) References Cited

U.S. PATENT DOCUMENTS 4,283,709 A 8/1981 Lucero et al.
4,624,459 A 11/1986 Kaufman
4,652,998 A 3/1987 Koza et al.
4,657,256 A 4/1987 Okada
4,669,731 A 6/1987 Clarke
4,718,672 A 1/1988 Okada
4,775,937 A 10/1988 Bell
4,837,728 A 6/1989 Barrie et al.
4,964,638 A 10/1990 Ishida
4,993,713 A 2/1991 Harada
5,010,995 A 4/1991 Okada
5,178,390 A 1/1993 Okada
5,229,764 A 7/1993 Matchett et al.
(Continued)

FOREIGN PATENT DOCUMENTS

DE 3242890 A1 5/1984
(Continued)

OTHER PUBLICATIONS

"Pachi-Slot Hisshogaido", Byakuya-Shobo Co., Ltd., 7th vol., No. 14, Oct. 1, 1996, pp. 88-89 (with English Abstract).

(Continued)

*Primary Examiner* — Dmitry Suhol
*Assistant Examiner* — Carl V Larsen
(74) *Attorney, Agent, or Firm* — Lexyoume IP Group, PLLC.

(57) ABSTRACT

A return is reliably executed to a player who has paid a predetermined amount to a game machine. The timing of this return is determined by lottery, and its result is displayed on the game machine. This thrills the player with expectation of the return, thereby keeping the player long on the same game machine. As the result, it is avoidable that the player waiting for a prize for a long time loses enthusiasm for the game and keeps away from the hall (i.e., a reduction in the number of customers).

8 Claims, 9 Drawing Sheets

U.S. PATENT DOCUMENTS

| | | | | |
|---|---|---|---|---|
| 5,280,909 | A | 1/1994 | Tracy | |
| 5,429,361 | A | 7/1995 | Raven et al. | |
| 5,564,700 | A | 10/1996 | Celona | |
| 5,611,730 | A | 3/1997 | Weiss | |
| 5,639,088 | A | 6/1997 | Schneider et al. | |
| 5,655,961 | A * | 8/1997 | Acres et al. | 463/27 |
| 5,674,128 | A | 10/1997 | Holch et al. | |
| 5,695,402 | A | 12/1997 | Stupak | |
| 5,702,303 | A | 12/1997 | Takemoto et al. | |
| 5,768,382 | A | 6/1998 | Schneier et al. | |
| 5,770,533 | A | 6/1998 | Franchi | |
| 5,810,665 | A | 9/1998 | Takemoto et al. | |
| 5,820,459 | A | 10/1998 | Acres et al. | |
| 5,836,817 | A * | 11/1998 | Acres et al. | 463/26 |
| 5,836,819 | A | 11/1998 | Ugawa | |
| 5,884,274 | A | 3/1999 | Walker et al. | |
| 5,890,963 | A | 4/1999 | Yen | |
| 5,910,048 | A * | 6/1999 | Feinberg | 463/25 |
| 5,941,773 | A * | 8/1999 | Harlick | 463/26 |
| 6,001,016 | A | 12/1999 | Walker et al. | |
| 6,003,013 | A | 12/1999 | Boushy et al. | |
| 6,018,718 | A | 1/2000 | Walker et al. | |
| 6,089,980 | A | 7/2000 | Gauselmann | |
| 6,110,043 | A * | 8/2000 | Olsen | 463/27 |
| 6,113,493 | A | 9/2000 | Walker et al. | |
| 6,135,884 | A * | 10/2000 | Hedrick et al. | 463/20 |
| 6,196,547 | B1 | 3/2001 | Pascal et al. | |
| 6,224,482 | B1 | 5/2001 | Bennett | |
| 6,234,896 | B1 | 5/2001 | Walker et al. | |
| 6,241,608 | B1 | 6/2001 | Torango | |
| 6,244,957 | B1 | 6/2001 | Walker et al. | |
| 6,254,483 | B1 * | 7/2001 | Acres | 463/26 |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,312,333 | B1 | 11/2001 | Acres | |
| 6,319,125 | B1 | 11/2001 | Acres | |
| 6,409,602 | B1 | 6/2002 | Wiltshire et al. | |
| 6,439,995 | B1 | 8/2002 | Hughs-Baird et al. | |
| 6,517,433 | B2 | 2/2003 | Loose et al. | |
| 6,575,832 | B1 | 6/2003 | Manfredi et al. | |
| 6,626,758 | B1 | 9/2003 | Parham et al. | |
| 6,638,165 | B2 | 10/2003 | Uchiyama et al. | |
| 6,645,078 | B1 | 11/2003 | Mattice | |
| 6,695,697 | B1 | 2/2004 | Okada | |
| 6,857,958 | B2 | 2/2005 | Osawa | |
| 6,878,063 | B2 | 4/2005 | Manfredi et al. | |
| 6,932,704 | B2 | 8/2005 | Walker et al. | |
| 6,932,707 | B2 | 8/2005 | Duhamel | |
| 6,984,173 | B1 | 1/2006 | Piechowiak et al. | |
| 7,465,232 | B2 * | 12/2008 | Okada | 463/42 |
| 2002/0039923 | A1 * | 4/2002 | Cannon et al. | 463/42 |
| 2002/0198039 | A1 | 12/2002 | Marks et al. | |
| 2003/0013516 | A1 | 1/2003 | Walker et al. | |
| 2003/0054873 | A1 | 3/2003 | Peterson | |
| 2003/0064809 | A1 | 4/2003 | Okada | |
| 2003/0064810 | A1 | 4/2003 | Okada | |
| 2003/0069067 | A1 | 4/2003 | Okada | |
| 2003/0069073 | A1 | 4/2003 | Okada | |
| 2003/0073486 | A1 | 4/2003 | Okada | |
| 2003/0073487 | A1 | 4/2003 | Okada | |
| 2003/0078095 | A1 | 4/2003 | Okada | |
| 2003/0119585 | A1 | 6/2003 | Walker et al. | |
| 2003/0220138 | A1 | 11/2003 | Walker et al. | |
| 2004/0048646 | A1 | 3/2004 | Visocnik | |
| 2005/0059480 | A1 | 3/2005 | Soukup et al. | |
| 2006/0009276 | A1 | 1/2006 | Okada | |
| 2007/0060250 | A1 | 3/2007 | Okada et al. | |
| 2007/0060277 | A1 | 3/2007 | Okada | |
| 2007/0060278 | A1 | 3/2007 | Okada | |
| 2007/0060279 | A1 | 3/2007 | Okada et al. | |
| 2007/0060280 | A1 | 3/2007 | Okada | |
| 2007/0060281 | A1 | 3/2007 | Okada et al. | |
| 2007/0060282 | A1 | 3/2007 | Okada et al. | |
| 2007/0060283 | A1 | 3/2007 | Okada | |
| 2007/0060324 | A1 | 3/2007 | Okada | |
| 2007/0105609 | A1 | 5/2007 | Okada | |
| 2007/0105621 | A1 | 5/2007 | Okada | |
| 2007/0105622 | A1 | 5/2007 | Okada | |
| 2007/0149269 | A1 | 6/2007 | Benbrahim | |
| 2008/0058050 | A1 | 3/2008 | Okada | |
| 2008/0058066 | A1 | 3/2008 | Okada | |
| 2008/0064473 | A1 | 3/2008 | Okada | |
| 2008/0064474 | A1 | 3/2008 | Okada | |
| 2008/0064475 | A1 | 3/2008 | Okada | |
| 2008/0064476 | A1 | 3/2008 | Okada | |
| 2008/0096632 | A1 | 4/2008 | Okada | |
| 2008/0102922 | A1 | 5/2008 | Okada | |
| 2008/0102930 | A1 | 5/2008 | Okada | |
| 2008/0119259 | A1 | 5/2008 | Okada | |
| 2008/0119262 | A1 | 5/2008 | Okada | |
| 2008/0125216 | A1 | 5/2008 | Okada | |
| 2008/0139287 | A1 | 6/2008 | Okada | |
| 2008/0139291 | A1 | 6/2008 | Okada | |
| 2008/0146310 | A1 | 6/2008 | Okada | |
| 2008/0153571 | A1 | 6/2008 | Okada | |
| 2008/0161090 | A1 | 7/2008 | Okada | |
| 2008/0214275 | A1 | 9/2008 | Okada | |
| 2008/0293482 | A1 * | 11/2008 | Okada | 463/25 |

FOREIGN PATENT DOCUMENTS

| | | | |
|---|---|---|---|
| DE | 3712841 | A1 | 11/1988 |
| DE | 4137010 | A1 | 8/1992 |
| DE | 10049444 | A1 | 11/2001 |
| DK | 4137010 | | 8/1992 |
| EP | 0631798 | | 1/1995 |
| EP | 0840264 | A1 | 5/1998 |
| EP | 1192975 | A1 | 4/2002 |
| EP | 1302914 | A2 | 4/2003 |
| EP | 1351180 | | 10/2003 |
| EP | 1477947 | | 11/2004 |
| EP | 1544811 | A2 | 6/2005 |
| GB | 2326830 | | 1/1999 |
| JP | S61-118377 | U | 7/1986 |
| JP | H04-244178 | A | 9/1992 |
| JP | 6-70951 | | 3/1994 |
| JP | H06-079051 | A | 3/1994 |
| JP | 07-171262 | | 7/1995 |
| JP | H07-299234 | A | 11/1995 |
| JP | 8-24401 | | 1/1996 |
| JP | H08-29169 | B2 | 3/1996 |
| JP | H08-336657 | A | 12/1996 |
| JP | 9-28905 | | 2/1997 |
| JP | 09-094340 | | 4/1997 |
| JP | H09-103576 | A | 4/1997 |
| JP | 09-264777 | | 10/1997 |
| JP | 10-33820 | | 2/1998 |
| JP | 10-94666 | | 4/1998 |
| JP | 10-118247 | | 5/1998 |
| JP | 10-234945 | | 9/1998 |
| JP | 11-19276 | | 1/1999 |
| JP | 11-146938 | | 6/1999 |
| JP | 11-253640 | | 9/1999 |
| JP | 2000-342772 | A | 12/2000 |
| JP | 2001-70510 | | 3/2001 |
| JP | 2001-204885 | A | 7/2001 |
| JP | 2001-259205 | | 9/2001 |
| JP | 2001-269441 | | 10/2001 |
| JP | 2003-47775 | | 2/2003 |
| JP | 2003-47779 | | 2/2003 |
| JP | 2003-53041 | | 2/2003 |
| JP | 2003-53042 | | 2/2003 |
| JP | 2003-71096 | | 3/2003 |
| JP | 2003-71097 | | 3/2003 |
| JP | 2003-71098 | | 3/2003 |
| JP | 2003-111888 | | 4/2003 |
| JP | 2003-111889 | | 4/2003 |
| JP | 2003-111890 | | 4/2003 |
| JP | 2003-111891 | | 4/2003 |
| JP | 2003-111897 | | 4/2003 |
| JP | 2003-117053 | | 4/2003 |
| JP | 2003-117070 | | 4/2003 |
| JP | 2003-117071 | | 4/2003 |
| JP | 2003-117072 | | 4/2003 |
| JP | 2003-117073 | | 4/2003 |
| JP | 2003-126343 | | 5/2003 |
| JP | 2003-205072 | | 7/2003 |

| | | |
|---|---|---|
| WO | 03/083795 | 10/2003 |
| WO | 2004-095383 | 11/2004 |
| WO | WO-2004/095383 | 11/2004 |

OTHER PUBLICATIONS

"Pachi-Slot Daizukan 2001" Byakuya-Shobo Co., Ltd. May 12, 2001, pp. 22, 24, 36.

Office Action mailed Oct. 25, 2010, in co-pending U.S. Appl. No. 11/735,104.

Office Action mailed Oct. 27, 2010, in co-pending U.S. Appl. No. 11/735,062.

Office Action mailed Dec. 10, 2010, in co-pending U.S. Appl. No. 12/183,720.

Office Action mailed Oct. 12, 2010, in co-pending U.S. Appl. No. 11/734,993.

Office Action mailed Dec. 10, 2010, in co-pending U.S. Appl. No. 12/183,814.

Office Action mailed Aug. 27, 2010, in co-pending U.S. Appl. No. 12/183,804.

Trick Monster 2, Pachi-Slot Hisshogaido Max 2001, Oct. 2001, Japan, Byakuya-Shobo Co., Ltd. Oct. 1, 2001, pp. 120 (with English Abstract).

Office Action issued Dec. 14, 2010 in Japan Application No. 2007-204698.

* cited by examiner

GAME SERVER, GAME CONTROL METHOD, AND GAME MACHINE

FIELD OF THE INVENTION

The present invention relates to a technique of controlling a return executed to players of pachislo game (Japanese slot game), pachinko (vertical pinball game), etc.

BACKGROUND OF THE INVENTION

Generally, a hall is equipped with a plurality of game machines for pachinko game, pachislo game, etc. Bach game machine in this hall is constructed so that a game is started with throwing of a game medium such as a pachinko ball or medal, and the game medium is paid out corresponding to a winning state (style) occurred in the course of the game.

This game machine is set such that a winning state occurs at a preset probability. Therefore, the player continues the game in expectation of a prize.

In the game machine that produces a prize merely depending on the probability as described, the probability of prize converges on the preset probability by performing a significant number of games. Accordingly, there is the following occasions: i) a player performing a small number of games has the fortune to get a prize before long; and ii) every player performing a large number of games is not reserved for prize. With the game machine of this type, gambling characteristics can be enhanced to make the game more amusing. On the other hand, the player waiting for a prize for a long time might lose enthusiasm for the game and keep away from the hall (i.e., a reduction in the number of customers).

In order to solve the above disadvantage, for example, there has been proposed the following techniques of: i) controlling return rates in game machines such that the average of the returns rates in all the game machines has a predetermined value (Japanese Patent Laid-Open Publication No. 6-79051); and ii) adjusting the probability of prize in consideration of the profit rate of a hall and the return rate to players (Japanese Patent Laid-Open Publication No. 11-253640). However, the techniques disclosed in these publications are still not directed to guarantee a return to players, although the players will suffer no unfairness by eliminating variations in the probability of a big prize per game machine.

As a typical slot game machine (slot machine), there is one that employs the following technique: i) depending on the consumed number of games, the probability of a big prize is changed so as to produce the big prize more frequently (Japanese Patent Laid-Open Publication No. 8-24401); or ii) the probability of prize on a reel slot is controlled to be changed depending on the medal payout rate during the past certain period of time (Japanese Patent Laid-Open Publication No. 11-146938). With the slot game machines employing the above technique disclosed in these publications, the probability of a big prize is increased depending on the consumed number of games. This burdens on a hall controlling a plurality of game machines. As the result, a reduction in the total returnable amount is unavoidable. In other words, the techniques in these publications are not directed to guarantee a return to players.

As a typical medal game machine, there is one that employs a technique of paying out a predetermined number of medals per game machine, when a predetermined wining-prize character occurs (Japanese Patent Laid-Open Publication No. 10-118247). However, this medal game machine is set such that the player can receive a profit of bonus when a specific wining-prize character occurs. Therefore, this machine is not directed to guarantee a return to players.

In a casino hall where a plurality of slot machines are disposed, part of credit consumed in every slot machine is reserved. When the amount of reservation reaches a certain sum of money, there is moved to the so-called "jackpot" mode that an exceedingly large amount is paid out to a certain slot machine. Concretely, every slot machine is set so as to produce a prize at a preset probability in the normal mode. Therefore, the player continues a game in expectation of a prize. In the meantime, the jackpot occurs on a certain slot machine at a given timing by lottery that is different from the usual prize lottery based on a preset probability set on the slot machines. In the case that the jackpot is so produced on a certain slot machine only, the sum of money obtained by the jackpot is extremely large. Such gambling characteristics can make the game more interest, whereas the probability of jackpot is extremely low, thereby failing to guarantee a return depending on the sum of money that the player throws in.

As stated above, the conventional game machines do not guarantee any return. Therefore, if a player receives no prize by performing a game for a while, the player unavoidably abandons the game itself or moves to other game machine and performs a game again. As the result, the player is less likely to perform a game with one game machine for a long period.

SUMMARY OF THE INVENTION

Accordingly, it is an object of the present invention to overcome the above-described technical problem by guaranteeing a return to a player thereby to prevent the player from keeping away from the hall, so that the player performs a game at one game machine for a long time.

The present inventor has conceived that the above object can be accomplished by configuring such that a return is reliably executed to a player who has paid a predetermined amount, and that the timing of this return is determined by lottery and its result is displayed on a game machine.

Specifically, the present invention based on this concept is as follows:

(1) A player who has performed a game with one game machine for a while can reliably receive a predetermined return, irrespective of the result of the game on the game machine. This avoids that the player waiting for a prize for a long time might lose enthusiasm for the game. In addition, the timing at which the return is executed is determined by lottery and its result is display on the game machine. This thrills the player with expectation of the return. As a display style of the lottery result, there are, for example, (i) "You have N games up to a return"; and (ii) "You missed this time but are in lottery mode." The player watching such a display will continue the game on the same game machine. Therefore, it is possible to keep the player long at the same game machine.

(2) When performing a lottery for determining the timing of a return, there is displayed on the game machine only the fact that a timing lottery was performed (i.e., it is brought into the state that a return will soon be executed), without displaying on the game machine a concrete timing at which the return is executed. With this configuration, the player can continue a game with the same game machine while expecting that "a return will soon be executed." As the result, it is possible to keep the player long at the same game machine. In addition, the information that "a return will soon be executed," which contains no information of a concrete return timing, will thrill the player with expectation. As the result, the game will be more interesting.

The present invention, advantage in operating the same and aims which are attained by implementing the present invention will be better appreciated from the following detailed description of illustrative embodiment thereof, and the accompanying drawings.

DETAILS DESCRIPTION OF THE PREFERRED EMBODIMENT

One preferred embodiment of the present invention will be described below in detail, based on the accompanying drawings.

[Overall Configuration of System]

Figure 1:
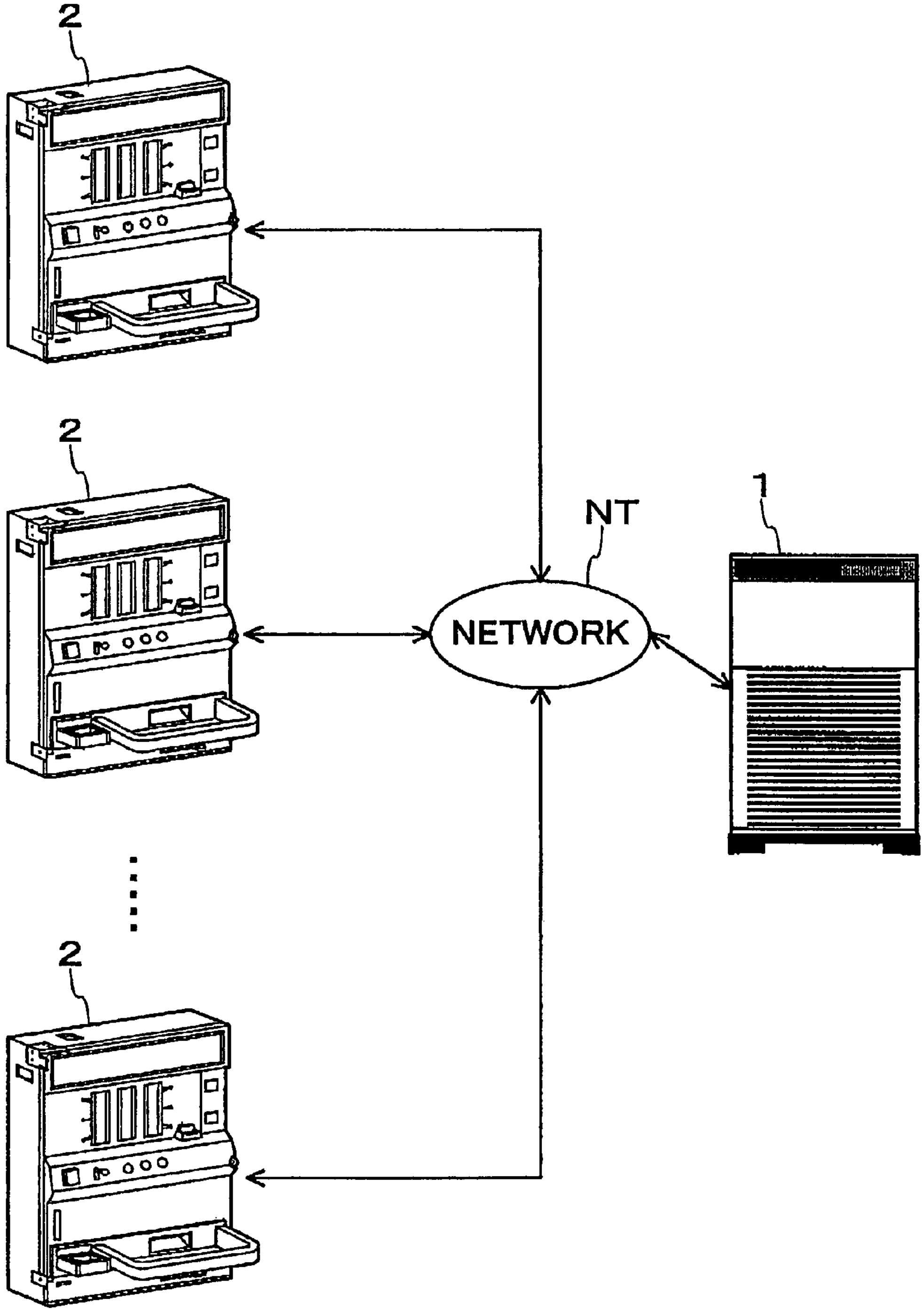
FIG. 1 is a diagram showing, in simplified form, the configuration of a game medium return system according to one preferred embodiment of the present invention.

FIG. 1 is a simplified diagram showing the configuration of a game medium return system according to one preferred embodiment of the invention. Referring to FIG. 1, this game medium return system comprises: i) a game server 1; and ii) a plurality of game machines 2 installed in a hall.

The game machines 2 are connected via a network NT to the game server 1, so that a variety of information are sent to and received from the game server 1 via the network NT.

The game server 1 controls a plurality of game machines 2 and discriminates the source of data sent from the game machines 2, based on the identification numbers being individual to the game machines 2. When the game server 1 sends data to any of the game machines 2, the game server 1 designates its destination by using the aforementioned identification numbers.

In the following description, the term "game server" is merely referred to as a "server."

[Mechanical Configuration of Game Machine]

Figure 2:
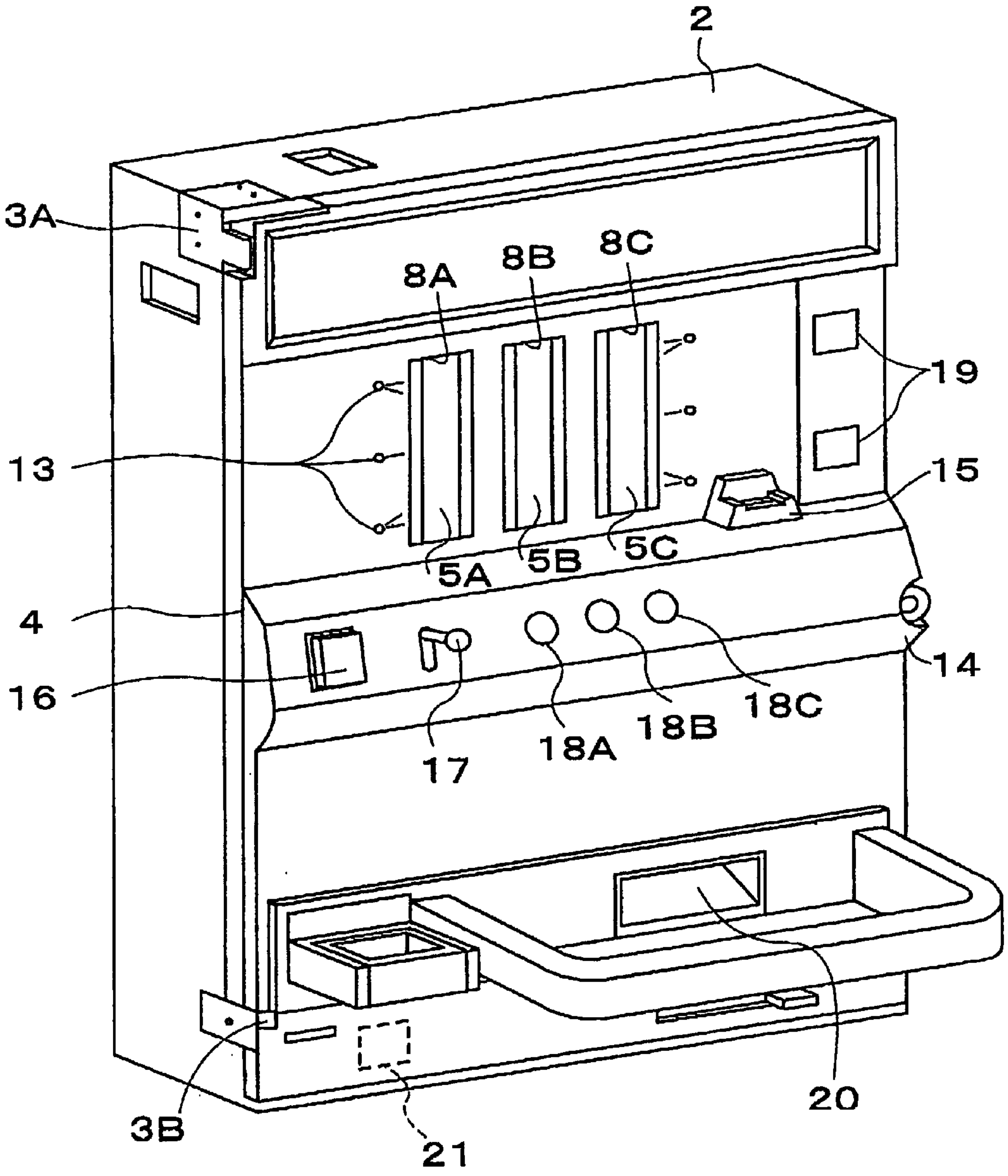
FIG. 2 is a perspective view showing the appearance of a game machine.
Figure 3:
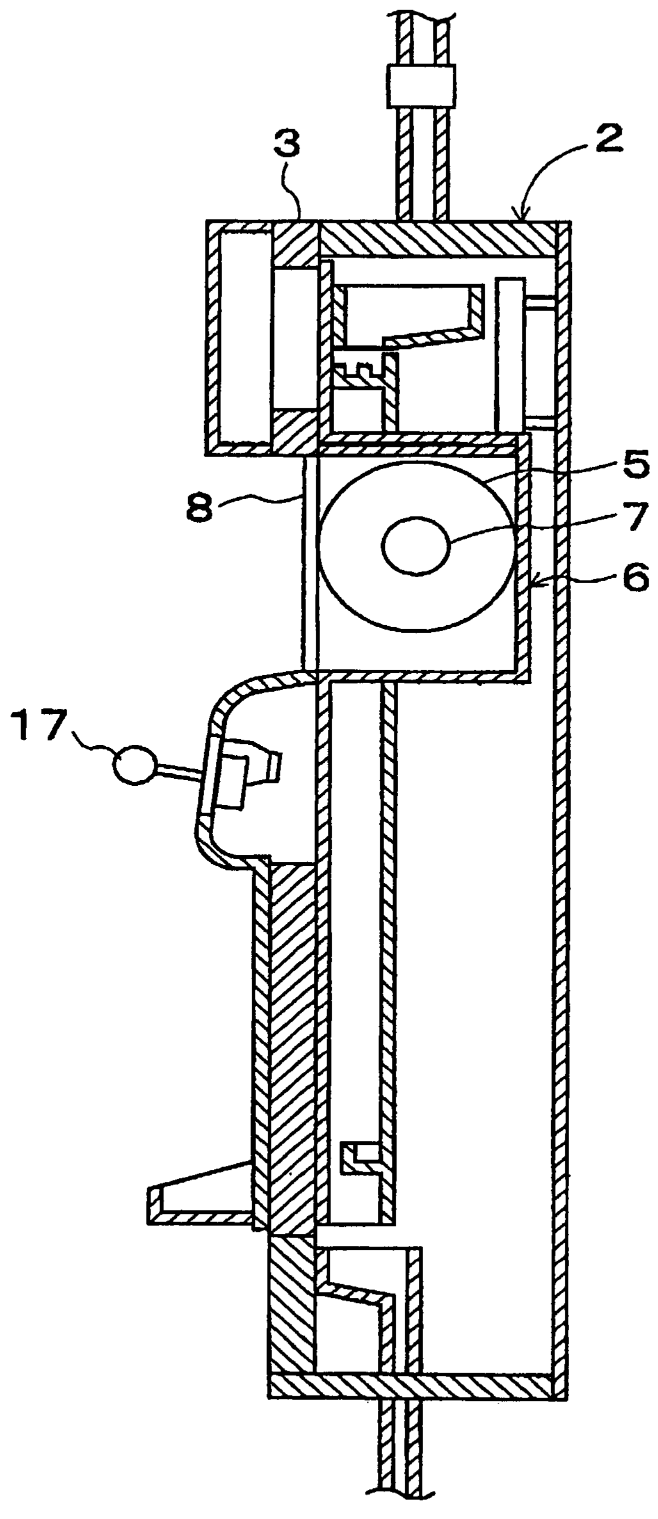
FIG. 3 is a vertical sectional view of the game machine.

FIG. 2 is a perspective view showing the outward appearance of a game machine. FIG. 3 is a vertical sectional view of the game machine. Referring to FIGS. 2 and 3, a game machine 2 is a slot game machine (slot machine) and has a frame body 3.

The frame body 3 is in the shape of hollow box. A front panel 4 is attached to the frame body 3 via hinges 3A and 3B so that it is able to open and shut.

Attached to the rear surface of the front panel 4 is a casing 6, with which three rotating drums 5 (5A to 5C) arranged across the width thereof are covered from their back face.

The drums 5A to 5C are of tubular shape and are supported rotatively about rotary axes 7. On the peripheral surfaces of the drums 5A to 5C, symbol marks (e.g., figure "7", bell, plum, cherry etc.) are respectively drawn so as to be aligned in a row around their periphery. Of the symbol marks drawn on the peripheral surfaces of the drums 5A to 5C, one symbol mark per drum is visible from the front side of the game machine 2 via windows 8A to 8C disposed on the front panel 4.

The rotary axes 7 of the drums 5A to 5C are attached rotatively via bearings (not shown) to a predetermined bracket (not shown) of the frame of the game machine 2. Every one end of the rotary axes 7 is coupled to output axes of stepping motors 11A to 11C (see FIG. 4). Thereby, the drums 5A to 5C are rotatively driven by the stepping motors 11A to 11C, respectively, and controlled such that they are stopped at a predetermined rotational angle position by a control device 12 (see FIG. 4).

Projection parts (not shown) indicating a standard position are disposed on the peripheral end parts of the drums 5A to 5C. The control device 12 detects the rotational standard positions of the drams 5A to 5C when these projection parts cross the optical 6 axes of optical sensors (not shown), which are disposed so as to correspond to the drums 5A to 5C. The rotational speed of the stepping motors 11A to 11C is set so as to make constant a fluctuating display speed of symbol marks.

Bet line indicator lamps 13 are disposed adjacent to the windows 8A to 8C. The lamps 13 have the function of indicating which line of a plurality of symbol mark stop lines displayed on windows 8A to 8C has been selected as an object of bet.

A control part 14 is disposed on the front panel 4. The control part 14 has a bet button 16. The bet button 16 is used in setting the number of medals to be bet among the medals thrown in via a throw-in slot 15. When the player pushes the bet button 16 by the number of medals on which the player desires to bet, the corresponding bet line indicator lamp 13 is lighted up. The upper limit of bet medals is three in the game machine 2.

The bet line varies depending on the depression number of the bet button 16. Concretely, by one depression, the object of bet is a single line extending horizontally in the middle stage of the windows 5A to 8C. By two depressions, the object of bet amounts to three lines obtained by adding two lines extending horizontally in the upper and lower stages of the windows 8A to 5C, to the above-mentioned line. By three depressions, the object of bet amounts to five lines obtained by adding two lines on the diagonal of the windows 8A to 9C, to the above-mentioned three lines. Four or more depressions are invalid.

When a bet medal number is set according to the above-mentioned procedure, the control device 12 takes medals corresponding to the bet medal number set by the player. Take of the medals establishes the game start conditions. In this state, when the player operates a start lever 17, the control device 12 rotates the drums 5A to 5C. That is, the bet medal number is credit consumption for performing a game.

The control part 14 has three stop buttons 18A to 18C disposed at locations that correspond to the drums 5A to 5C, respectively. Depress of the stop buttons 18A to 18C, the drums stop in response to the depressions.

The front panel 4 has digital indicators 19. The indicators 19 display the following contents; i) the number of medals thrown in before starting a game; ii) the number of medals to be discharged; and iii) the contents of return guarantee (for example, "by consuming 25,000 YEN, 5,000 YEN is returned."). When one of predetermined specific combinations of symbol marks (winning states) in the drums 5A to 5C is aligned on the stop line on which the player bets, a medal payout device discharges a predetermined number of medals to a medal payout tray 20, according to the weight of the combination (the type of a combination of symbol marks). In addition, when executing a return, the server 1 performs a lottery for determining the timing at which the return is executed, and its result is sent from the server 1 to the game machine 2 and then displayed on the indicator 19. As example of such display, there are for example (i) "You have N games up to a return"; and (ii) "You missed this time but are in lottery mode." The player watching such a display will continue the game with the same game machine.

A player sensor 21 for player detection is disposed on a front part of the game machine 2. The player sensor 21 detects the player seated before the game machine 2. For example, an infrared ray sensor is usable as the player sensor 21. When output level variations in the player sensor 21 continues for a predetermined period of time or more, a CPU 33 (see FIG. 4) judges that a player is seated before the game machine 2. On the other hand, when the output of the player sensor 21 indicates the absence of any player, the CPU 33 activates an internal timer. Then, if the absence of any player continues for a predetermined period of time or more, the CPU 33 judges that the player has ceased playing on the game machine 2. Thereby, even if the player is temporarily apart from the game machine 2, it is not judged that the player has terminated his/her play at that time. The presence of any player is judged by the player sensor 21, it is possible to employ the following methods. Concretely, (i) A card reader that reads game player information from identification cards being individual to players is attached to the game machine 2 and, based on the player information read by the card reader, the player performing a game is discriminated and it is detected whether the player terminates the game; or (ii) A weight sensor is attached to a stool of the game machine 2. Based on the output of the weight sensor, the presence of any player is judged.

[Electrical Configuration of Game Machine]

Figure 4:
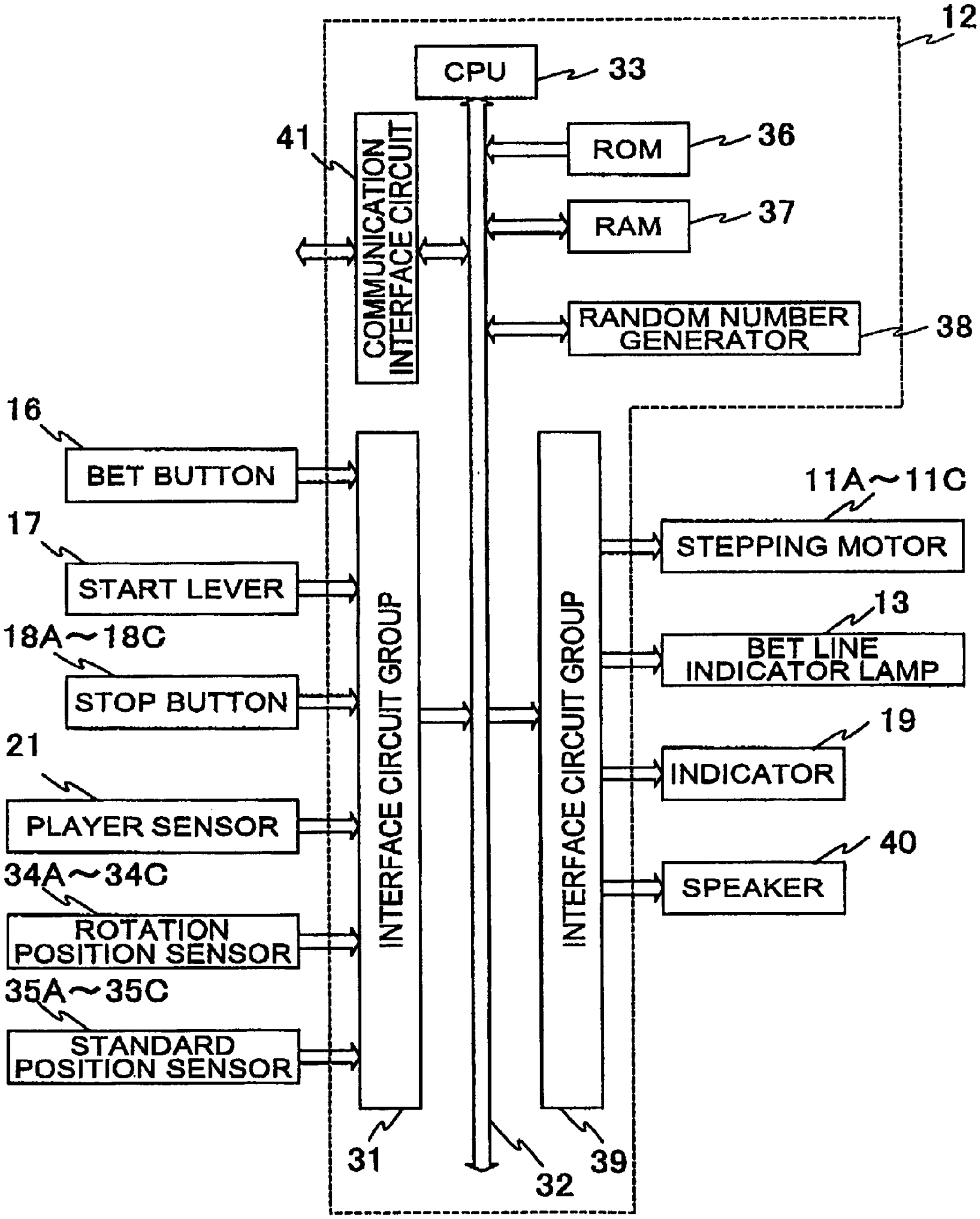
FIG. 4 is a block diagram showing the electrical configuration of the game machine.

FIG. 4 is a block diagram showing the electrical configuration of a game machine. Referring to FIG. 4, a control device 12 of the game machine 2 comprises: i) first interface circuit group 31; ii) input/output bus 32; iii) CPU 33; iv) ROM 36; v) RAM 37; vi) random number generator 38 vii) second interface circuit group 39; and viii) communication interface circuit 41.

The bet button 16 is connected to the first interface circuit group 31 that is connected to the input/output bus 32. When the player depresses the bet button 16, an operation signal is issued from the bet button 16 to the interface circuit group 31. The interface circuit group 31 converts the operation signal to a predetermined voltage signal and provides it to the input/output bus 32. Accordingly, before starting a play, a predetermined number of medals corresponding to a value indicated by the operation signal are thrown into the game machine 2 as the object of bet.

The input/output bus 32 performs input/output of data signals or address signals to the CPU 33.

The start lever 17 and stop buttons 18A to 18C are connected to the first interface circuit group 31. The first interface circuit group 31 converts i) a start-up signal issued from the start lever 17; and ii) a stop signal issued from the stop buttons 18A to 18C, to predetermined voltage signals, and provides these signals to the input/output bus 32.

When the start lever 17 is operated to start a game, the start-up signal is provided to the CPU 33. Upon receiving the start-up signal, the CPU 33 issues a control signal to the stepping motors 11A to 11C in order to rotate the drums 5A to 5C.

When the stop buttons 18A to 18C are depressed to stop the drums 5A to 5C, the respective stop signals are provided from the stop buttons 18A to 18C to the CPU 33. If desired to stop the first drum 5A, the player operates the first stop button 18A. If desired to stop the second drum 5B, the player operates the second stop button 18B. If desired to stop the third drum 5C, the player operates the third stop button 18C. Upon receiving the stop signal, the CPU 33 issues the stop signal to the stepping motors 11A to 11C, in order to stop the drum corresponding to the operated stop button.

Rotational position sensors 34A to 34C are connected to the first interface circuit group 31. The sensors 34A to 34C are disposed in the vicinity of the stepping motors 11A to 11C, respectively. The sensors 34A to 34C issue angle position signals that respectively indicate the rotational angle positions of the stepping motors 11A to 11C, to the interface circuit group 31. For example, rotary encoders can be employed as the rotational position sensors 34A to 34C.

Standard position sensors 35A to 35C are connected to the first interface circuit group 31. The sensors 35A to 35C are disposed in the vicinity of the drums 5A to 5C, respectively. Upon detecting the standard positions of the drums 5A to 5C, the sensors 35A to 35C issue signals of the standard positions to the interface circuit group 31. The standard position sensors 35A to 35C consist of the above-mentioned optical sensor.

The player sensor 21 is connected to the first interface circuit group 31. When the player sensor 21 detects that a certain player is playing on the game machine 2, it issues a player detection signal to the interface circuit group 31.

The CPU 33 detects: i) angle position signals issued from the rotational position sensors 34A to 34C; and ii) standard position signals issued from the standard position sensors 35A to 35C, thereby obtaining data of symbol marks displayed on the windows 8A to 8C.

The ROM 36 and RAM 37 are connected to the input/output bus 32. The ROM 36 stores: i) a program under which the game machine 2 is controlled so as to pay out a game medium such as medal; and ii) an initial value of variable used in the program. On the other hand, the RAM 37 stores flags and variable values.

More specifically, the ROM 36 stores a data group indicating correspondence between a combination of symbol marks and random numbers. The random number generator 38 for generating the above random numbers is connected to the input/output bus 32. When the CPU 33 issues an instruction for generating random numbers to the random number generator 38, the random number generator 38 generates random numbers in a predetermined range and issues a signal indicating the random numbers to the input/output bus 32. When a random number is issued from the random number generator 38, in order to determine a combination of symbol marks that corresponds to the random number, the CPU 33 searches the above data group and then substitutes a value corresponding to the combination of symbol marks.

The communication interface circuit 41 is connected to the input/output bus 32. This circuit 41 is used in sending and receiving data between the game machine 2 and server 1.

Either one of normal game and special game can be played on the game machine 2.

In the normal game, there are i) an enabled prize-winning status that a combination of symbol marks stopped and displayed on an effective line can match a prize-winning pattern: and ii) unable prize-winning status that a combination of symbol marks cannot match a prize-winning pattern.

In the unable prize-winning status, examples of symbol mark combinations that change on effective lines are: i) a failure pattern; and ii) a small prize pattern. The term "small prize" means that a predetermined number of symbol marks such as "cherry" and "bell" are aligned on an effective line and a few medals are discharged to the payout tray 20. On the other hand, the term "failure pattern" means that, unlike the small prize pattern, symbol marks are not aligned on any effective line and no medals are discharged. The unable prize-winning status can move to the enabled prize-winning status by an internal lottery processing to be described hereafter. In the unable prize-winning status, any prize-winning pattern cannot be aligned irrespective of a timing at which the stop buttons 18A to 18C are depressed. Hence, it is impossible to move to the special play status.

On the other hand, only in the enabled prize-winning status, a combination of symbol marks stopped and displayed by a timing at which the stop buttons 18A to 18C are depressed will match a prize-winning pattern. In other words, this state allows for "aiming (observation push)." When a combination of symbol marks stopped and displayed on an effective line matches a prize-winning pattern, the player wins a prize and the game mode moves to the special game providing a chance of obtaining a large number of medals. When the player fails to obtain any prize-winning pattern by missing a timing of depressing the stop buttons 18A to 18C, the above-mentioned failure pattern or small prize pattern is aligned. If once the enable prize-winning status is set, this status continues until a combination of symbol marks stopped and displayed matches a prize-winning pattern. There is no change (move) to the unable prize-winning status.

In the special game, it is so arranged that there is extremely high probability that a combination of symbol marks stopped and displayed on an effective line will match a small prize pattern. This leads to a high possibility of obtaining a large number of medals. On finishing the special game, the game mode moves to the normal game. In the case of moving from the special game to the normal game, a decision as to whether the game proceeds in the enabled prize-winning status or the unable prize-winning status is made by an internal lottery processing to be described later.

The second interface circuit group 39 is also connected to the input/output bus 32. To the circuit group 39, there is connected: i) stepping motors 11A to 11C; ii) bet line indicator lamp 13; ii) indicator 19; and iv) speaker 40. The circuit group 39 provides a drive signal or drive power to the above components. For instance, when the player depresses the bet button 16, a drive current is applied to the bet line indicator lamp 13, in order to indicate a bet line that becomes effective in accordance with the number of throw-in medals. When a game is over, a drive signal is applied to the indicator 19, in order to indicate the score corresponding to the prize-winning status at that time. The speaker 40 issues an effect sound corresponding to the game status, when a game begins or terminates.

[Electrical Configuration of Game Server]

Figure 5:
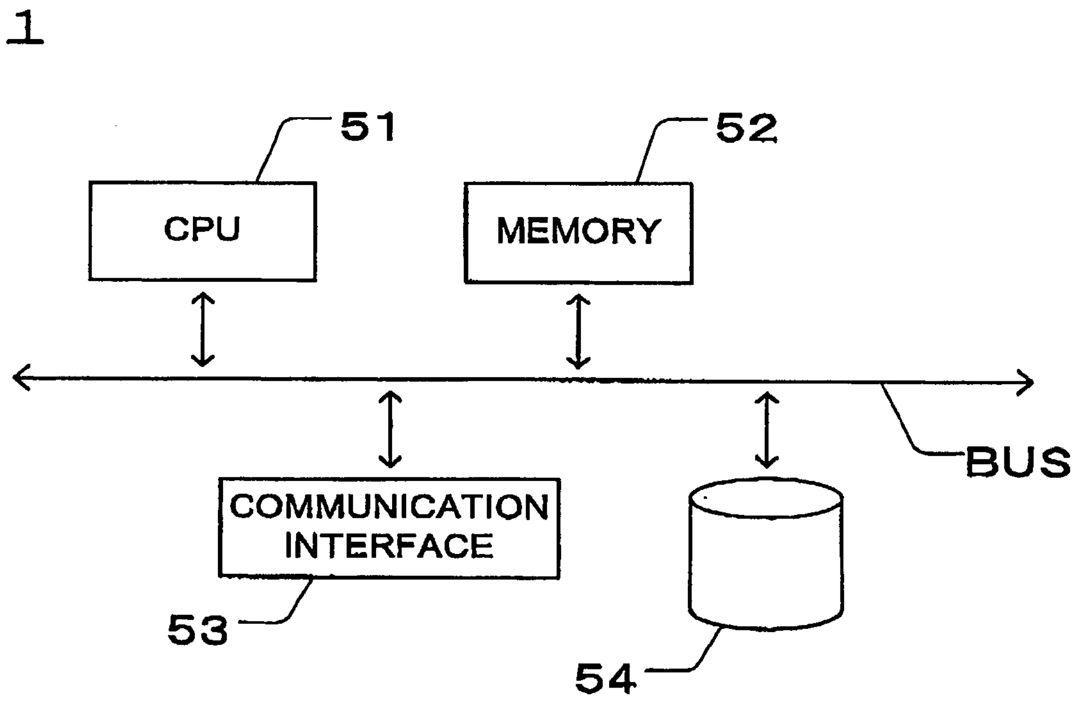
FIG. 5 is a block diagram showing the electrical configuration of a game server.

FIG. 5 is a block diagram showing the electrical configuration of a game server. Referring to FIG. 5, a server 1 has a data bus BUS. To the data bus BUS, there is connected i) CPU 51; ii) memory 52; iii) communication interface 53; and iv) database 54.

The CPU 51 executes various processings according to programs stored in the memory 52. Specifically, the CPU 51 receives data from the game machine 2 via a communication line connected by the communication interface 53, and stores data in the memory 52. This data is for example the upper limit data, return rate data and the like of a plurality of game machines 2 under the control of the server 1, that is, information seat from each game machine 2 under the control of the server 1. The CPU 51 reads a program stored in the database 54 on the memory 52, and progresses the program based on the information sent from each game machine 2 which is stored in the memory 52. The progress of the program is stored in the database 54.

It is assumed in the following, for purposes of description, that the game machine 2 is activated in advance, and flags and variables are initialized to a predetermined value.

[Basic Operation of Game Machine]

Figure 6:
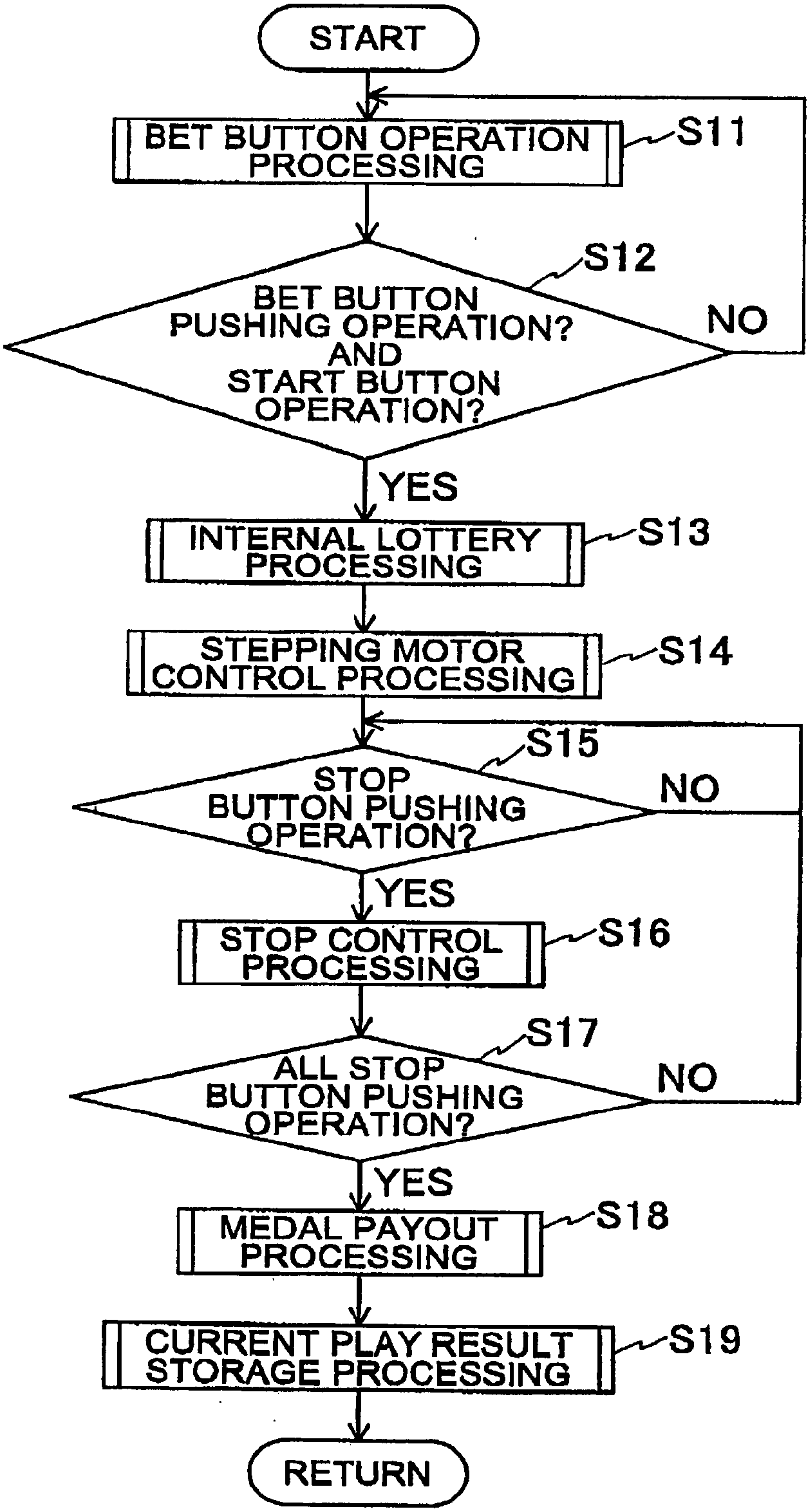
FIG. 6 is a flowchart showing the flow of control of the game machine.

FIG. 6 is a flowchart showing the flow of control of a game machine. Referring to FIG. 6, firstly, the CPU 33 connected with the game machine 2 judges whether the bet button 16 is pressed by a certain player (step S11). This bet-button operation judgment processing is executed in accordance with the pressing operation to the bet button 16, and includes the following processing: i) detecting whether an operation signal is issued from the bet button 16 in response to the pressing operation to the bet button 16, thereby storing the number of game medals thrown in by the above operation (i.e., a medal credit number); and ii) issuing a drive signal to the bet line indicator lamp 13, in order to indicate the bet line that becomes effective in accordance with the number of throw-in medals.

Upon completing the bet-button operation processing, the CPU 33 judges whether the pressing operation to the bet button 16 is performed and the operation of the start lever 17 is performed (step S12). When the CPU 33 judges that both operations are performed, the CPU 33 moves the processing to step S13. On the other hand, when the CPU 33 judges that both are not performed or neither operation is performed, the CPU 33 returns the processing to step S11, and performs the bet-button operation processing again. As will be described hereafter, a period of time that all the drums 5A to 5C are started in rotation and are brought into a stop is referred to as a sequence of game (play).

Upon moving to the processing of step S13, the CPU 33 executes an internal lottery processing (step S13). This internal lottery processing includes the following processing of: i) controlling the random number generator 38 to generate random numbers; and ii) searching a data group indicating the correspondence between combinations of symbol marks and random numbers, thereby deciding a combination of symbol marks in accordance with the generated random numbers. The combination of symbol marks stopped and displayed on the previous game is stored in the RAM 37, as will be described hereafter. By the CPU 33, this combination of symbol marks stored in the RAM 37 is read and used for an internal lottery processing in the following game.

In the internal lottery processing, a combination of symbol marks that can be stopped and displayed is determined by lottery, and a value indicating the lottery result is substituted to a lottery data for an ongoing game (i.e., a current game lottery data). For instance, when it is in the unable prize-winning status and in failure pattern, the current game lottery data is set to "00". When it is in the unable prize-winning status but a match with a small prize pattern occurs, the current game lottery data is set to "01". When it is in the enabled prize-winning status, the current game lottery data is set to "12". When it is in the special game status and in failure pattern, the current game lottery data is set to "20". When it is in the special game status and a match with a small prize pattern occurs, the current game lottery data is set to "21".

Upon completing the above-mentioned internal lottery processing, the CPU 33 reads a subroutine about stepping motor control processing (not shown) and issues, based on this subroutine, control signals to the stepping motors 11A to 11C, in order to drive each motor at a predetermined rotational speed (step S14). The term "rotational speed" means a speed at which symbol marks are changeably displayed by the rotation of the drums 5A to 5C in the above-mentioned sequence of games. That is, any speed in transient circumstances, such as immediately after the drums are started in rotation and immediately before they are brought into a stop, is excluded from the concept of the rotational speed.

In this preferred embodiment, there is a lottery data of a game performed in the past (i.e., a past game) that corresponds to the above-mentioned current game lottery data. This past game lottery data is data indicating the lottery result of a game performed before an ongoing game (i.e., a current game), and is data is stored in the RAM 37. As will be described hereafter, in the normal game that is the next to be performed after the special game is over, the past game lottery data is reset before the first game is stared. The past game lottery data is updated by sequentially accumulating the current game result in the previous game result.

Upon completing the above-mentioned stepping motor control processing, the CPU 33 judges whether the player depressed any one of the stop buttons 18A to 18C, in order to stop the drums 5A to 5C, and a stop signal of the stop buttons 18A to 15C is issued or not (step S15). When the CPU 33 judges that no stop signal is issued from the stop buttons 18A to 18C, the CPU 33 executes again step S15. On the other hand, when the CPU 33 judges that a stop signal is issued from any one of the stop buttons 18A to 18C, the CPU 33 stops the stepping motors 11A to 11C (step S16). This stepping motor stop processing includes: i) controlling the random number generator 38 to generate random numbers; and ii) searching a data group indicating the correspondence between combinations of symbol marks and random numbers, thereby deciding a combination of symbol marks in accordance with the generated random numbers.

The CPU 33 obtains symbol marks currently appearing on the windows 8A to 8C, based on i) rotational position signals issued from the rotational position sensors 34A to 34C; and ii) standard position signals issued from the standard position sensors 35A to 35C. Upon obtaining of the symbol marks, the CPU 33 controls the stepping motors 11A to 11C and decides a stop position, in accordance with i) the above-mentioned symbol mark data and ii) the current game lottery data set in the above-mentioned internal lottery processing (step S13).

Although the CPU 33 stops the stepping motors 11A to 11C in accordance with the current game lottery data, if judged that any one of the stop buttons 18A to 18C is pressed, the CPU 33 can apply an additional drive to the stepping motors 11A to 11C, under prescribed conditions. Specifically, when any symbol mark corresponding to the current game lottery data cannot be stopped and displayed, an additional drive in the range of the maximum amount of four symbol marks can be applied to the stepping motors 11A to 11C. In this connection, if any symbol mark corresponding to the current game lottery data is not present in that range, it is impossible to stop and display any symbol mark corresponding to the current game lottery data. For instance, even when in the enabled prize-winning status, two drums are already stopped and there is a symbol mark(s) allowing for match with a winning pattern, whether the player obtains the winning pattern depends on the timing at which the player operates the stop button corresponding to the last drum to be stopped. On the other hand, when in the unable prize-winning status, two drums are already stopped and there is a symbol mark(s) allowing for match with a winning pattern, the stepping motors 11A to 11C are controlled so as not to provide a match with the winning pattern, irrespective of the timing of operation of the stop button corresponding to the last drum to be stopped.

Upon completing the above-mentioned stop control processing, the CPU 33 judges whether all the stop button 18A to 18C are depressed (step S17). In other words, the processing of step S17 is to judge whether all the stop signals issued in accordance with the operation to the stop buttons 18A to 18C are detected. When the CPU 33 judges that all the stop buttons 18A to 18C are not operated, the CPU 33 returns the processing to the above-mentioned step S15. On the other hand, when the CPU 33 judges that all the stop buttons 18A to 18C are operated, the CPU 33 moves the processing to step S18.

Upon moving to the processing of step S18, the CPU 33 judges whether a combination of symbol marks aligned on an effective line matches with a winning status, and pays out a game medal corresponding to the winning status (step S18). In this medal payout processing, when the CPU 33 judges that the combination of symbol marks aligned in the effective line matches the wining state, the CPU 33 calculates the number of payout game medals corresponding to the wining status, and pays out the number of medals corresponding to the calculated number. Thereafter, the CPU 33 moves the processing to step S19. On the other hand, when the CPU 33 judges that the combination of symbol marks aligned in the effective line does not match the winning state, the CPU 33 performs no game medal payout and moves the processing to step S19.

Upon moving to the processing of step S19, the CPU 33 mainly stores the above-mentioned current game lottery data (step S19). In this preferred embodiment, the CPU 33 reads the past game lottery data from the RAM 37, and directs the RAM 37 to store the current game lottery data in addition to the read past game lottery data. At this time, the RAM 37 stores not only the current game lottery data but also data indicating the symbol marks that have actually been stopped and displayed in the current game.

[Return Operation in Game Machine]

Figure 7:
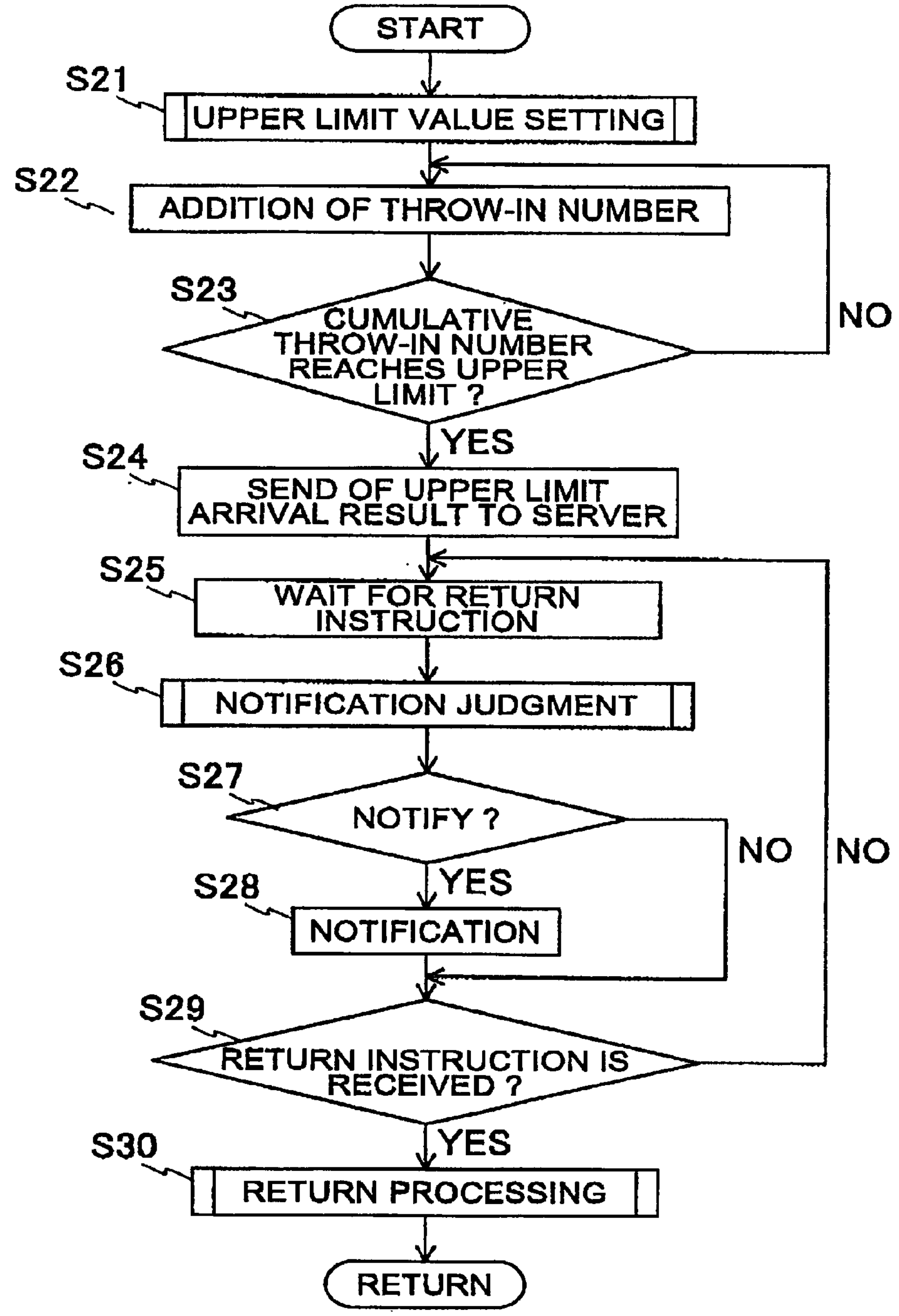
FIG. 7 is a flowchart showing the flow of operation of the game machine.

FIG. 7 is a flowchart showing the flow of operation of the game machine. The procedure shown in this flowchart is a processing routine that is performed concurrently with the subroutine of the game machine 2 shown in FIG. 6. This processing routine is started when a player's play status is detected.

Referring to FIG. 7, as soon as a player starts a game on the game machine 2, the CPU 33 in the game machine 2 sets an upper limit value that is used as a standard on return execution (step S21). The term "upper limit value" means the number of medals etc. as a game medium (a credit cumulative consumption), which are used for performing a game on a slot game machine, for example. Therefore, a return is executed through the slot game machine when the number of medals used by the player reaches the upper limit value.

This upper limit value setting is attainable by various styles. For example, there are the following styles of: i) using a preset upper limit value; ii) setting an upper limit by the owner of the game machine; and iii) automatically changing the upper limit according to the play status.

Following is the style of using a preset upper limit value among the above-mentioned styles. In this instance, the preset upper limit value is stored in the RAM 37, and the CPU 33 reads data of the upper limit value from the RAM 37 and completes the upper limit value setting.

Upon completing the above-mentioned upper limit value set processing, the CPU 33 adds the number of medals thrown by the player as a game medium (step S22), based on the result of the processing of step S11 shown in FIG. 6.

A medal sensor (not shown) contained in the game machine 2 counts medals thrown in through the throw-in slot 15. Of the counted number data, the number of medals actually used for the game as a consumed medal data is stored by adding into a credit cumulative consumption data (data of medals consumed in the past). This cumulative consumption data is initialized when the player terminates the game. The player sensor 21 detects termination of a player's game (or player change). By resetting the cumulative consumption data before a player starts a game, a fair return according to the game medium (credit) consumption is guaranteed to an players.

The above-mentioned cumulative consumption data is stored in the RAM 37. The CPU 33 reads cumulative consumption data from the RAM 37 and adds consumption data during the above-mentioned sequence of games into the read cumulative consumption data, so that data of this addition result is stored in the RAM 37, as update cumulative consumption data.

Upon completing the above-mentioned throw-in medal number addition processing, the CPU 33 judges whether the cumulative consumption reaches the upper limit (step S23).

This judgment is attainable by comparing i) the cumulative consumption data stored in the RAM 37 in step S22; and ii) the upper limit value set in step S21. That is, the CPU 33 compares the above two data stored in the RAM 37 and judges whether the number of medals that the player threw in the game machine 2 reaches the upper limit.

When the CPU 33 judges that the cumulative consumption does not reach the upper limit value, the CPU 33 returns the processing to step S22, and resumes the throw-in medal number addition processing.

On the other hand, when the CPU 33 judges that the cumulative consumption reaches the upper limit value, the CPU 33 sends the result of the judgment to the server 1 (step S24). Specifically, the CPU in the game machine 2 sends i) a signal indicating that the cumulative consumption reaches the upper limit value; ii) data of the upper limit value set in step S21; and iii) data of return rate to be described later, to the server 1 via the communication interface circuit 41 with the game machine 2.

The signal indicating arrival at the upper limit is expressed for example by numerical value of "1". The signal indicating that the cumulative consumption reaches the upper limit is accompanied by a signal designating the game machine 2 (i.e., data that identify among a plurality game machines 2 under the control of the server 1). For example, if an identification-number, e.g., "123", is assigned to the game machine 2 among a plurality of game machines under the control of the server 1, a signal of "1-123", wherein the numerical value "1" as the signal indicating arrival at the upper limit is affixed ahead of the identification-number "123" of the game machine 2, is sent to the sever 1.

The upper limit value data is stored in the RAM 37, as described above. The upper limit value is data used for determining the number of return medals when a return is executed to the player. The number of return medals is calculated by multiplying the upper limit value by a return rate to be described later.

Further, the RAM 37 in the game machine 2 stores data about a return rate at which a return is executed with respect to the upper limit value of the game machine 2. This return rate data is displayed on the indicator 19 and says, for example, "when 25,000 YEN is consumed, 5,000 YEN is returned," and the same is also sent to the server 1.

Upon completing the upper-limit-arrival signal sending processing, the CPU 33 in the game machine 2 waits for a return instruction (step S25). The term "return instruction" means a signal that is sent from the server 1 to the game machine 2 of which cumulative consumption reaches the upper limit. This signal is also used for controlling the timing of return etc. All the while waiting for the return instruction, the game machine 2 allows for the player's play.

In the above-mentioned return instruction waiting status, the CPU 33 judges whether notification should be executed or not (step S26). The term "notification" means to notify the player that the number of medals thrown into the game machine 2 reaches the upper limit.

As a style of the notification judgment processing, there is one that merely judges whether notification should be executed, and one that judges the timing at which notification should be executed. Following is the former style.

By referring to data stored in the RAM 37, the CPU 33 judges whether this notification should be executed (step S27). The RAM 37 stores data about execution of notification. Concretely, data of "1" is assigned when notification is executed, and data of "0" is assigned when no notification is executed. These data may be preset or set properly by the owner of the game machine etc.

When the data stored in the RAM 37 is "1", the CPU 33 notifies a player that the cumulative throw-in medal number of the game machine 2 that this player is performing a game reaches the upper limit (step S28). This notification may be executed by using an illuminator contained in the game machine 2. Alternatively, the game machine 2 may have a display part that performs notification to the player. Any notification means for informing the player that he/she has passed through the upper limit may be employed, whether it be provided unitary with the game machine 2.

Upon completing notification processing, or upon judging non-execution of notification, the CPU 33 judges whether a return instruction is received (step S29).

This return instruction is one that the game machine 2 waits for sending from the server 1 in step S25. The server 1 sends this return instruction without fail to the game machine 2 employing a style that a return is executed every time the player reaches the upper limit, as well as the game machine 2 employing other style that a return is not always executed when the player reaches the upper limit.

The server 1 sends a return instruction signal at a predetermined timing to the game machine 2 via the communication interface 53. The CPU 33 in the game machine 2 receives the return instruction signal via the communication interface circuit 41 and input/output bus 32. Upon receiving no return instruction signal the CPU 33 returns the processing to step S25 and waits for a return instruction again.

Upon receiving the return instruction, the CPU 33 executes return processing (step S30). This return processing is executed based on the return instruction issued from the server 1 in step S29, more specifically, based on data contained in the return instruction that indicate a return rate at which a return is executed to the game machine 2.

In the above-mentioned game machine employing the style that a return is executed every time the throw-in medal number reaches the upper limit, a return is executed with the number of medals that is calculated on the server 1, mainly based on: i) the upper limit data stored in the RAM 37; and ii) return rate data. Based on the return instruction from the server 1, the CPU 33 enters a return mode by changing a return mode flag to "1", and directs the RAM 37 to temporarily store a return-medal number. In this return mode, the contents of the internal lottery processing (step S13) and medal payout processing (step S18) are different from that shown in the procedure shown in FIG. 6. Specifically, upon entering the return mode, the CPU 33 forcedly produces a "big prize" in the above-mentioned internal lottery processing (step S13) in the ongoing procedure. Then, the CPU 33 reads the return-medal number contained in the received return instruction from RAM 37, in the above-mentioned medal payout processing (step S18), and pays out the number of medals corresponding to the read return-medal number. Return-medal number calculation processing on the server 1 will be described later. Upon completing the medal payout processing (step S1) in the return mode, the CPU 33 changes the return mode flag to "0", and returns to the normal game mode.

In a game machine 2 to which a return has been executed, the CPU 33 in this game machine 2 resets consumption data stored in the RAM 37. In this way, consumption counting is renewed every time resetting is performed. The resetting of consumption data is executed according to program that is stored in the ROM 36, receiving the instruction from CPU 33.

Upon completing this return processing, the CPU 33 returns to the upper limit value setting processing shown in FIG. 7 (step S21), and repeats the above-mentioned sequence of processing.

Although the return is executed by forcedly producing the "big prize" in the foregoing, a probability table that is stored in the RAM 37 and used for producing a big prize may be altered. This probability table is used for setting the range of random numbers generated by the random generator 38 (see FIG. 4) which can produce a big prize. A narrow range set by this probability table permits a low probability of "big prize", whereas a wide range permits a high probability. Therefore, when a return instruction is sent from the server 1 to a game machine 2, the CPU 33 in this game machine 2 alters the probability table based on the received return instruction. At this time, a return is executed by increasing the probability of "big prize."

In this preferred embodiment, it is possible to employ a style that a return is not always executed when the throw-in medal number of the game machine 2 reaches the upper limit. In this instance, when no return is executed, the CPU 33 resets consumption data stored in the RAM 37, as required. In this way, consumption data counting is renewed every time that resetting is performed.

[Operation of Game Server]

Figure 8:
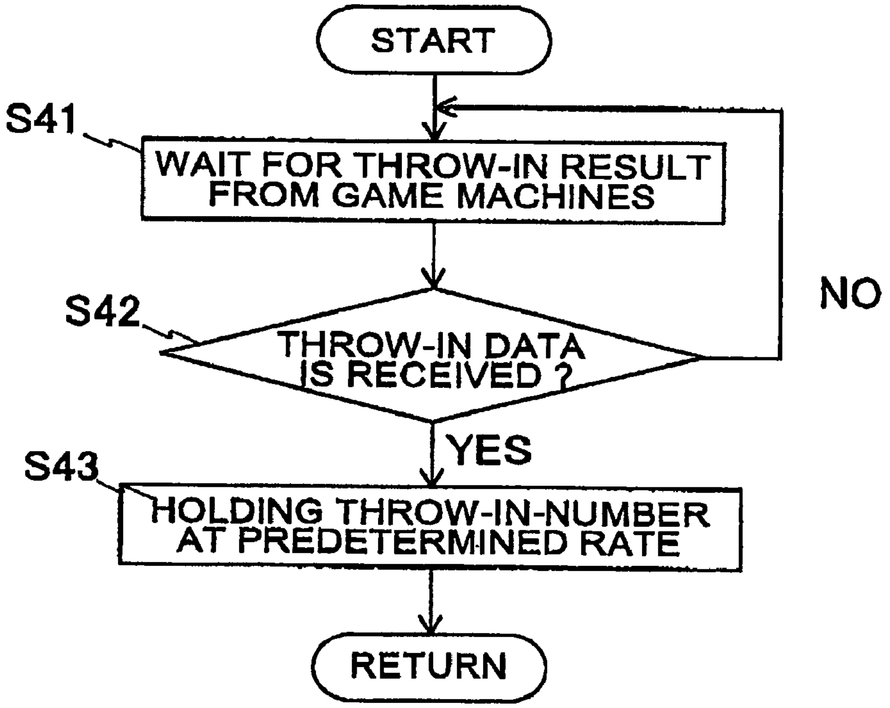
FIG. 8 is a flowchart showing the flow of operation when the game server prepares for a return.

FIG. 8 is a flowchart showing an operation flow when a game server prepares a return. This operation is to be repeated all the time on the server 1.

Referring to FIG. 8, the server 1 always holds some of medals that are game media thrown in each game machine 2, in order to execute a return to a game machine 2 under control of the server 1, when it reaches the upper limit. That is, the CPU 51 in the server 1 is waiting for the result of throw-in game medium from each game machine 2 (step S41).

As the game medium that the game player uses on each game machine 2, it is possible to use any tangible matters such as medals, winning balls, and coins, each being used generally. Besides these tangible matters, any intangible matters may be used which can be expressed in numerical value data and be sent and received during play.

The term "throw-in" means the following action that a player makes a game machine recognize a game medium used for playing a game, irrespective of the game medium style. Therefore, not only a medal etc. that is thrown in through the throw-in slot 15 and detected by the medal sensor (not shown) contained in the game machine 2, but also numerical value data that the player decides to use for playing a game becomes a candidate for thrown-in.

In the status that the server 1 is waiting for a game medium throw-in, the CPU 51 in the server 1 judges whether game medium throw-in data is received at a predetermined timing (step S42).

In this preferred embodiment, medals are used as a game medium, and the player continues a game on each game machine 2, while throwing in medals via the throw-in slot 15. The medal sensor in the game machine 2 detects the throw-in medals, so that they are counted and made into a numerical value as data. This numerical value data is stored in the RAM 37 in the game machine 2, as cumulative consumption data. This cumulative consumption data is sent at a predetermined timing to the server 1 via the communication interface circuit 41.

The server 1 receives this cumulative consumption data via the communication interface 53, so that a predetermined percent of this data is properly stored (held) in the memory 52, based on an instruction of the CPU 51.

When the above-mentioned throw-in data is not received in the judgment processing in step 42, the CPU 51 returns the processing to step S41. Upon receiving the throw-in data, the CPU 51 holds a predetermined percent of consumption (step S43).

As stated above, the server 1 holds in advance some of game media that are used for a return to the game machines 2 under control of the server 1. The holding amount differs from one server to another. The holding amount can be calculated by multiplying a predetermined rate by the cumulative consumption data of each game machine 2 that the server 1 receives.

In this holding processing, the server 1 sends a numerical value data corresponding to the holding amount calculated by the CPU 51, to the game machine 2 via the communication interface 53. Upon receiving the numerical value data, the CPU 33 in the game machine 2 directs the RAM 37 to store, as holding data, the numerical value data that is part of the cumulative consumption data.

Upon completing the holding processing, the CPU 51 returns the processing again to the throw-in data waiting processing in step S41, and repeats the above-mentioned sequence of processing.

Figure 9:
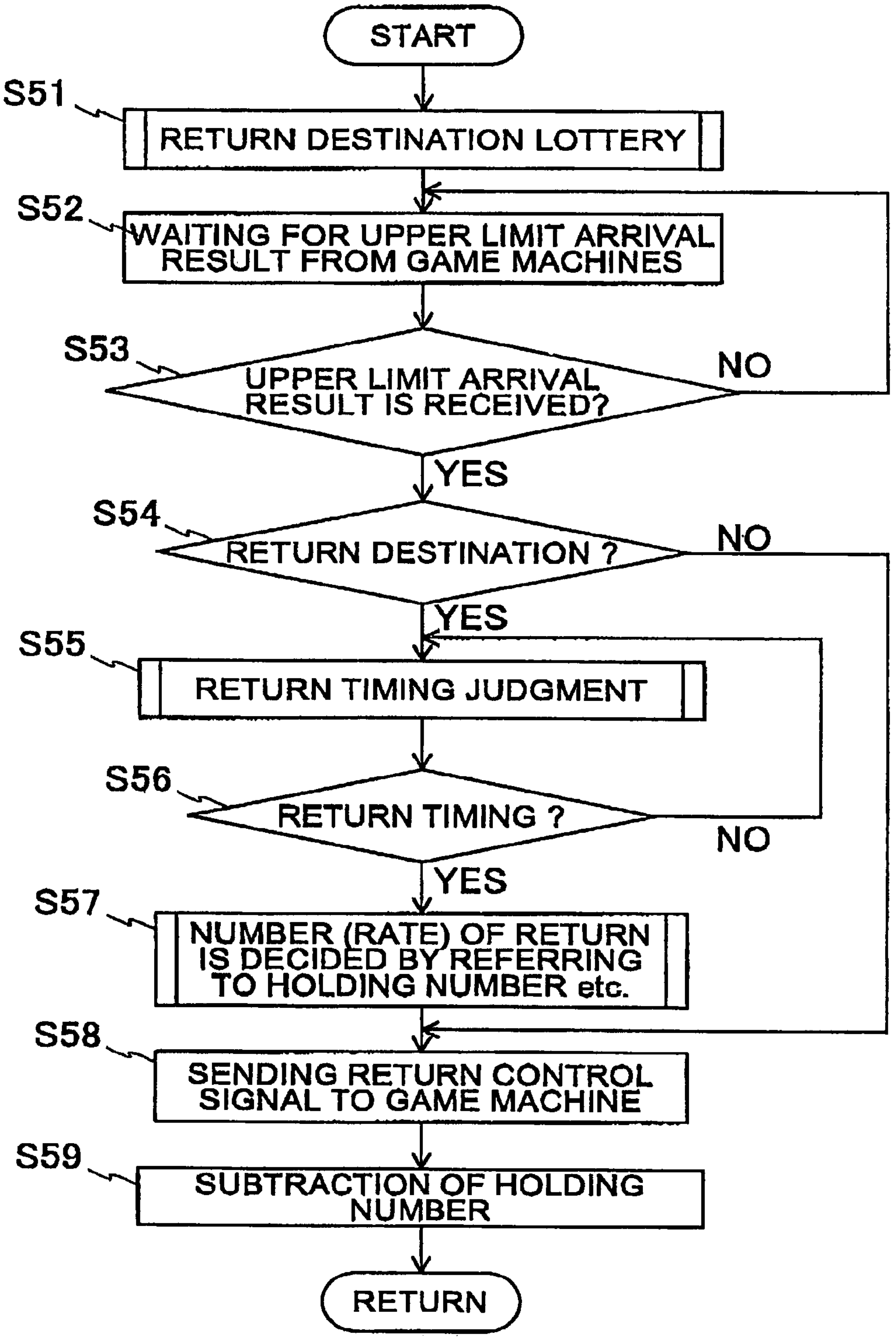
FIG. 9 is a flowchart showing the flow of operation when the game server performs the return.

FIG. 9 is a flowchart showing an operation flow when a game server executes a return. This operation is to be repeated all the time. Referring to FIG. 9, firstly, the CPU 51 in the server 1 determines a return destination by lottery (step S51).

This return destination lottery is performed when employing the style that a return is not always executed to the game machine 2 reaching the upper limit. As a lottery style, there are for example: i) "a return is executed to a game machine that is the N-th to reach the upper limit," and ii) "a return is executed to a game machine, the end of which machine-number meets a lottery-number." In the case of employing the style that a return is executed every time a game machine reaches the upper limit, there are for example lottery results that: i) "a return is executed to a game machine that is the first to reach the upper limit" and ii) "a return is executed to a game machine, the end of which machine-number meets 0, 1, . . . 9, as a lottery-number (i.e., all the machine numbers are designated)." Meanwhile, when employing the style of executing a return without fail, all the game machines that reach the upper limit are return candidates in step S51. Thus, in the case of reliably executing a return, the CPU 51 performs a lottery for determining the timing of the return to the game machine 2 that becomes a return destination when its credit consumption reaches the upper limit. Specifically, a return to the next succeeding game machine 2 of which consumption reaches the upper limit is executed according to the following result: (i) when the N-th number of game is performed on the game machine 2; or (ii) immediately after reaching the upper limit.

The CPU 51 directs these lottery results to be stored in the memory 52.

Upon completing this return destination lottery processing, the CPU 51 waits for the upper limit arrival result sent from each game machine 2 (step S52). As described with reference to FIG. 6, the upper limit arrival result indicates that the game medium thrown in the game machine 2 reaches a preset amount. Specifically, the upper limit arrival judgment is made on the game machine 2. When this judgment result is that the game medium number reaches the upper limit, this result is sent to the server 1. The server 1 waits for the upper limit arrival result via the communication interface 53.

While the server 1 is waiting for the upper limit arrival result, the CPU 51 in the server 1 judges whether the upper limit arrival result is received at a predetermined timing (step S53). When the CPU 51 judges that the upper limit arrival result is received, the CPU 51 moves the processing to the step S54. On the other hand, when the CPU 51 does not judge so, the CPU 51 returns the processing to step S52, and repeats the processing in step S53.

Upon moving to the processing of step S54, the CPU 51 judges whether the game machine 2 that has sent the upper limit arrival result is a return destination. This judgment is made based on the data produced by the lottery performed in step S51. That is, the CPU 51 refers to data stored in the memory 52 and compares this reference data with data appended to the upper limit arrival result. For example, when a lottery result is "a return will be executed to a game machine, the end of which machine-number meets a lottery-number," the CPU 51 reads data of the game machine's identification-number appended to the above lottery result and judges whether the end of his number is meets the lottery-number.

In the case of employing the style that a return is executed every time the upper limit arrival is attained, a positive result is always obtained in the return destination judgment processing.

When the CPU 51 judges that it is not the return destination, the CPU 51 sends a signal indicating non-execution of return in a processing of sending a return control signal to be described later. An instruction of the CPU 51 directs this signal to be sent to the game machine 2 via the communication interface 53.

Upon obtaining a positive result in the return destination judgment processing, the CPU 51 determines the timing of a return (step S55).

Various return timing styles can be considered. There are for example, i) to the game machine 2 that has reached the upper limit and corresponds to the return destination, a return is forcedly executed immediately after all the processing on the server 1 are completed; and ii) a return is executed after an elapse of a predetermined period of time from the completion of all the processing on the server 1.

This return timing judgment processing is to judge which one of the above two timings is to be used for executing a return. If a return timing is predetermined uniquely, this return timing is employed. On the other hand, in the case of determining a return timing by lottery, the CPU 51 randomly selects one from a plurality of candidates stated in the memory 52 (e.g., "immediately", "after the X-th game", "after X minutes", and "when the next big prize occurs") in step S55.

Relating to return timing, various timings are determined by lottery (timing lottery) as described above. In the above-mentioned step S55, however, the credit consumption of a certain game machine 2 has already reached the upper limit. Therefore, in step S55, the CPU 51 directs this game machine 2 to display that "a return timing lottery was executed," so that the player is informed of a return to be executed at one of the above-mentioned timings. Accordingly, the player will stay at the same game machine 2 and continue the game.

Upon completing the return timing judgment processing, the CPU 51 judges whether a return timing is established (step S56).

The above-mentioned return timing is determined in step S55 and stored in the memory 52 in the server 1. For example, if given, as this stored data, a temporal timing such as "after a few minutes from the upper limit arrival," a timer (not shown) contained in the server 1 is used to wait this timing. If given a timing corresponding to the player's game circumstances such as "after the player performs the 20th game from the upper limit arrival," various sensors contained in the game machine 2 are used and, when predetermined conditions are satisfied, the CPU 33 in the game machine 2 sends the server 1 a signal indicating the contents of this timing. In either case, the CPU 51 directs the game machine 2 to display the timing of a return on the indicator 19 etc., in order to inform the player that the return will be executed.

In other words, the server 1 performs the processing in step S56, in order to start a return-related processing when the return timing is established. When the CPU 51 judges that the return timing is not established, the CPU 51 returns the processing to step S55, and resumes the processing from step S55. On the other hand, when the CPU 51 judges that the return timing is established, the CPU 51 refers to the game medium amount (number) held in step S43, and determines the amount of return (step S57).

The return amount to the game machine 2 is managed by using the game media held in step S43 (see FIG. 8). Usually, upon reaching of the upper limit arrival, a return is executed by the amount that is obtained by multiplying the upper limit by a preset return rate. In this instance, the server 1 calculates (i) the return number based on the upper limit data contained in the upper limit arrival result and (ii) return rate data (these data are sent from the game machine 2). In addition to the usual return number, the server 1 executes more return at a predetermined probability, based on data indicating a return rate sent from the game machine 2. This return operation is a mode into which the CPU 51 enters by detecting the holding number stored in the memory 52. The CPU 51 determines a predetermined return number, irrespective of the data indicating the return rate sent from the game machine 2. This return number is far larger than that in other return, thereby further increasing game characteristics.

Upon completing this return number determination processing, the CPU 51 sends a return control signal to the game machine 2 (step S58).

The return control signal sent from the server 1 to each game machine 2 can be classified into two types. To a game machine 2 that is judged as being return destination in the above-mentioned return destination judgment processing (step S54), the value of "1" indicating the return destination is appended to part of a return control signal. On the other hand, to a game machine 2 that is judged as not being return destination, the value of "0" indicating so is appended to part of a return control signal. In the case of employing the style that a return is executed every time the upper limit arrival is attained, the value of "1" may be set to every return control signal.

Additionally, the above-mentioned return control signal also contains data for determining the degree of return.

An instruction of the CPU 51 directs the entire data including this data (i.e., a return control signal) to be sent to a game server 2 via the communication interface 53. Upon receiving the return control signal, the game machine 2 performs a return based on this return control signal.

Upon completing the above-mentioned control signal sending processing, the CPU 51 subtracts a holding number (step S59).

The term "holding number" means the number of game media held in the memory 52 with the server 1, in step S43 shown in FIG. 8. The held game media are used for executing a return to each game machine 2. It is therefore necessary to subtract the number of game media corresponding to the payout number every time the return is completed.

In this holding number subtraction processing, data updated by the subtraction is newly stored in the memory 52. In the instance that the return number to the game machine 2 is changed depending on the play status, the following construction may be employed. Upon completing the return to the game machine 2, the CPU 33 with the game machine 2 sends the server 1 data indicating the payout number to the player. Upon receiving this data, the server 1 moves to the subtraction processing.

Upon completing the above-mentioned holding amount subtraction processing, the CPU 51 returns the processing to step S51, and resumes the processing from the return destination lottery processing.

As stated above, the game medium (credit number) thrown in each game machine 2 is temporarily held therein and, at a predetermined timing, the number of game media stored until then is sent to the server 1 as a credit cumulative consumption. In this preferred embodiment, the server 1 calculates a predetermined rate of the cumulative consumption sent from each game machine 2, and the server 1 stores the calculation result as a holding number. As an alternative, a previously calculated result may be sent from each game machine 2 to the server 1.

[Operations and Effects]

Preferred embodiments produce mainly following operations and effects.

(1) The server 1 holds the number of game media that is obtained by multiplying the cumulative consumption of credit (Same media) in each game machine 2 by a predetermined rate. Based on this holding number, the server 1 executes a return at a predetermined return rate to the game machine 2 on which the game medium cumulative consumption of one player exceeds a certain amount. Thereby, the player is guaranteed to a return by performing a game with the same game machine 2 for a while. It is therefore avoidable that a player loses enthusiasm for the game and keeps away from the hall.

(2) Some of players may terminate the game before receiving a return. In this occasion, the number of game media held by the server 1 is increased thereby to increase the amount of return.

(3) When executing a return to the game machine 2, the server 1 determines its timing by lottery, so that the return to be reliably executed occurs at different timings, and also directs the game machine 2 to display the lottery result. This thrills the player with expectation of the return.

(4) The player is detected, and a return is executed based on the result of the detection. Thereby, the return is executed to the player satisfying the return conditions. In other words, although a return is performed via a game machine 2, the return is executed to the player satisfying the conditions (i.e., the credit cumulative consumption) in the game machine 2. Therefore, this player can perform a game with the assurance that "a return is guaranteed by continuously performing a game on the same game machine." In addition, the result of the return timing lottery is displayed, thereby keeping this game player at the same game machine 2 and continue the game.

(5) When a player terminates the game on a certain game machine 2, the credit cumulative consumption of this player is reset. Accordingly, every time the player of a game machine 2 is changed to other player, the credit consumption in the game machine is counted from zero. Therefore, the return under predetermined conditions is executable to every player without unfairness. In addition, when executing this return, the return timing lottery result is displayed, thereby keeping the player long at the same game machine so as to continue the game.

While but one embodiment of the invention has been shown and described, it will be understood that many changes and modifications may be made therein without departing from the spirit or scope of the present invention.

What is claimed is:

1. A game server, comprising:

a controller that collectively controls a plurality of game machines which are brought into a status enabling to start a game based on a throw-in coin number or given credit number, and which are subjected to a payout according to a result of said game, wherein the controller performs a lottery for determining a timing of a return;

a first sending unit that sends a control signal for executing the return at a predetermined return rate to one of the game machines on which a player is continuously performing the game, irrespective of the result of the game when a cumulative coin or credit consumption reaches a predetermined upper limit by the player based on information about coin or credit consumption in the one of the game machines on which the player is performing the game, wherein the controller judges that the one of the game machines that has reached the predetermined upper limit is a return destination; and a second sending unit that sends a display control signal, based on a result of the lottery for determining the timing of the return, for displaying said result of the lottery for determining the timing to the one of the game machines on which the player is performing the game when the return is discharged, wherein the controller performs a return destination lottery and determines the timing of the return after judging that the one of the game machines that has reached the predetermined upper limit is the return destination.

2. The game server according to claim 1 wherein said display control signal is to direct said one of the game machines to perform a display only for notifying that said lottery for determining the timing was performed.

3. The game server according to claim 1 wherein the cumulative coin or credit consumption reaching the predetermined upper limit does not always result in executing a return.

4. The game server according to claim 1 wherein, when a return is executed, the cumulative coin or credit consumption is reset.

5. A method for collectively controlling a plurality of game machines, comprising:

bringing each of the game machines into a status enabling to start a game based on a throw-in coin number or given credit number;

subjecting each of the game machines to a payout according to a result of said game;

detecting whether a cumulative coin or credit consumption of a player reaches a predetermined upper limit based on information about a coin or credit consumption of one of the plurality of game machines on which said player is playing a game;

judging that the one of the plurality of game machines that has reached said predetermined upper limit is a return destination;

executing a return at a predetermined return rate to said one of the plurality of game machines on which said player is continuously playing irrespective of the game result when a result of said detecting is that said cumulative coin or credit consumption of said player reaches said predetermined upper limit;

performing a lottery for determining a timing at which the return is executed; and displaying a result of said lottery for determining the timing on said one of the plurality of game machines on which said player is playing, wherein a return destination lottery is performed and the timing of the return is determined after judging that the one of the game machines that has reached the predetermined upper limit is a return destination.

6. The method according to claim 5 wherein, in said displaying, said one of the plurality of game machines is subjected to a display control only for notifying that said lottery for determining the timing was performed, as the result of said lottery for determining the timing.

7. A game system, comprising:

a plurality of game machines, each of which brought into a status enabling to start a game based on a throw-in coin number or given credit number and each of which subjected to a payout according to a result of said game; and a game server that collectively controls said plurality of game machines, wherein a CPU for determining a timing of a return is provided, each of said plurality of game machines including a return unit that executes a return at a predetermined return rate and at a predetermined timing to a player in accordance with a control signal from said game server, irrespective of the game result when a cumulative consumption reaches a predetermined upper limit based on information about a coin or credit consumption in a game machine on which the player is continuously performing the game, wherein the CPU judges that the game machine, which has reached the predetermined upper limit, is a return destination; and a display unit that displays, based on a result of a lottery for determining the timing of said return determined by the CPU, said result of the lottery for determining the timing based on a display control signal from said game server when said return unit executes the return, wherein the CPU performs a return destination lottery and determines the timing of the return after judging that one of the game machines that has reached the predetermined upper limit is the return destination.

8. The game system according to claim 7 wherein said result of the lottery for determining the timing is displayed only for notifying that said lottery for determining the timing was performed.

* * * * *